US012782165B2

(12) United States Patent
Toulon et al.

(10) Patent No.: US 12,782,165 B2
(45) Date of Patent: Nov. 3, 2026

(54) METHOD FOR MEASURING THE ANGULAR POSITION OF A ROTARY SHAFT OF A MOTOR VEHICLE

(71) Applicant: Continental Automotive Technologies GmbH, Hannover (DE)

(72) Inventors: Dariga Toulon, Ramonville-Saint-Agne (FR); Thierry Chauchard, Pechbonnieu (FR)

(73) Assignee: Continental Automotive Technologies GmbH, Hannover (DE)

( * ) Notice: Subject to any disclaimer, the term of this patent is extended or adjusted under 35 U.S.C. 154(b) by 251 days.

(21) Appl. No.: 18/730,226

(22) PCT Filed: Feb. 8, 2023

(86) PCT No.: PCT/EP2023/053060
§ 371 (c)(1),
(2) Date: Jul. 18, 2024

(87) PCT Pub. No.: WO2023/156264
PCT Pub. Date: Aug. 24, 2023

(65) Prior Publication Data
US 2026/0219074 A1 Jul. 30, 2026

(30) Foreign Application Priority Data
Feb. 18, 2022 (FR) ....................................... 2201447

(51) Int. Cl.
*G01D 5/16* (2006.01)
*G01B 7/30* (2006.01)

(52) U.S. Cl.
CPC ................. *G01D 5/16* (2013.01); *G01B 7/30* (2013.01)

(58) Field of Classification Search
CPC .................................... G01D 5/16; G01B 7/30
See application file for complete search history.

(56) References Cited

U.S. PATENT DOCUMENTS 8,232,795 B2 7/2012 Saruki et al.
9,475,520 B2 * 10/2016 Yanai ....................... G01B 7/31
(Continued)

FOREIGN PATENT DOCUMENTS

| | | | |
|---|---|---|---|
| EP | 1308698 | A2 | 5/2003 |
| JP | 2011158488 | A | 8/2011 |
| WO | 2021041093 | A1 | 3/2021 |

OTHER PUBLICATIONS

International Preliminary Report on Patentability issued on Sep. 13, 2022, by République Française, INPI, France, in corresponding Application No. FR2201447, with machine translation. (18 pages).
(Continued)

*Primary Examiner* — Walter L Lindsay, Jr.
*Assistant Examiner* — Milton Gonzalez
(74) *Attorney, Agent, or Firm* — Buchanan Ingersoll & Rooney PC

(57) ABSTRACT

A method for measuring the angular position of a rotary shaft of a motor vehicle by a target fixed at a free end of the shaft and a position sensor mounted facing the target. The method includes the steps of generating a first sine signal and a first cosine signal characterizing the angular variations of the target relative to the sensor when the shaft is rotating, generating a second sine signal and a second cosine signal characterizing the angular variations of the target relative to the sensor when the shaft is rotating, generating a first angle value signal and a second angle value signal, and calculating the mean angular position of the shaft at a given time on the basis of the first angle value signal, the second angle value signal, and the predetermined phase shift value.

7 Claims, 5 Drawing Sheets

(56) References Cited

U.S. PATENT DOCUMENTS

| | | | | |
|---|---|---|---|---|
| 10,871,365 | B2 * | 12/2020 | Furukawa | G01B 7/30 |
| 2021/0055131 | A1 | 2/2021 | Dupre et al. | |

OTHER PUBLICATIONS

International Search Report (PCT/ISA/210) with translation and Written Opinion (PCT/ISA/237) mailed on Apr. 11, 2023, by the European Patent Office as the International Searching Authority for International Application No. PCT/EP2023/053060. (17 pages).

* cited by examiner

METHOD FOR MEASURING THE ANGULAR POSITION OF A ROTARY SHAFT OF A MOTOR VEHICLE

CROSS REFERENCE TO RELATED APPLICATIONS

This application is the U.S. National Phase Application of PCT International Application No. PCT/EP2023/053060, filed Feb. 8, 2023, which claims priority to French Patent Application No. 2201447, filed Feb. 18, 2022, the contents of such applications being incorporated by reference herein.

DESCRIPTION

Field of the Invention

The present invention relates to the field of shaft position sensors in a motor vehicle and more particularly concerns a method for measuring the angular position of a rotary shaft of a motor vehicle by means of a target fixed at a free end of said shaft and a position sensor mounted facing said target, together with a position sensor suitable for implementing said method.

Background of the Invention

It is currently known practice to use a so-called "position" sensor in a motor vehicle in order to measure the angular position of a shaft relative to a reference position. For example, it is known practice to measure the angular position of a crankshaft or camshaft of an internal combustion engine in order to determine the timings for the injection of fuel into the cylinders.

As is known, the sensor is mounted facing a free end of the shaft, in the center of which is mounted a magnetic target. The sensor uses the electromagnetic response of the target to generate a sine signal and a cosine signal representative of the angular variations of the target relative to the sensor when the shaft is rotating and the arc tangent of which makes it possible to obtain an angle value signal giving the angular position of the shaft relative to the reference position. This sensor can be a TMR (tunnel magnetoresistance), GMR (giant magnetoresistance), or AMR (anisotropic magnetoresistance) sensor.

In one known solution, the sensor comprises an electronic circuit on which are mounted a first Wheatstone bridge making it possible to generate the sine signal and a second Wheatstone bridge making it possible to generate the cosine signal. In the case of an AMR sensor, the first Wheatstone bridge and the second Wheatstone bridge are mechanically offset by an angle of 45°. In the case of a GMR or TMR sensor, the first Wheatstone bridge and the second Wheatstone bridge are mechanically offset by an angle of 90°.

An eccentricity tolerance is permitted when the sensor is being mounted relative to the center of the target. Likewise, an angularity tolerance is permitted between the electronic circuit and the target, which should ideally be parallel. However, these tolerances result in an error in the value of the angular position delivered by the sensor. In particular, the more the sensor is offset relative to the center of the target, and therefore from the axis of rotation of the shaft, the more the error increases.

FIG. 1 shows the variation in the error Err (in degrees) observed between the calculated angle and the actual angle (in degrees) as a function of the actual angle ANG (in degrees) of the shaft. It can be seen that the error Err between the calculation performed by the sensor and the actual angular position ANG of the shaft can be up to approximately plus or minus 8°.

One solution would consist in ensuring the centered, parallel placement of the sensor and the target, but the mounting constraints on production lines always involve tolerances. Another solution consists in processing the angle value signal by filtering in order to reduce the error. However, the effectiveness of such processing can be limited, in particular as it only works correctly at a fixed frequency. The error also remains significant. FIG. 2 shows the error Err (in degrees) observed between the calculated angle and the actual angle (in degrees) as a function of the actual angle ANG (in degrees) of the shaft following processing by filtering. It can be seen that the error Err between the calculation performed by the sensor and the actual angular position ANG of the shaft can be up to approximately plus or minus 0.12° for an eccentricity offset of 0.25 mm. In addition, processing the angle value signal by filtering requires significant processing capacity, in terms of both hardware and software, which is another drawback.

It would therefore be advantageous to propose a solution that makes it possible to at least partially overcome these drawbacks.

SUMMARY OF THE INVENTION

An aspect of the invention aims to further reduce the error in the measurement of the angular position of a rotary shaft by a position sensor in a motor vehicle. An aspect of the invention aims to reduce the measurement error generated by the misalignment and/or the non-parallelism of a position sensor relative to a target fixed on the free end of a rotary shaft in a motor vehicle. An aspect of the invention aims to provide a simple, reliable and effective solution for reducing the measurement error of a motor vehicle position sensor.

To this end, an aspect of the invention firstly relates to a method for measuring the angular position of a rotary shaft of a motor vehicle by means of a target fixed to a free end of said shaft and comprising a magnetic element, and a magnetoresistive position sensor mounted facing said target, said method comprising the steps of:

- generating a first sine signal and a first cosine signal characterizing the angular variations of the target relative to the sensor when the shaft is rotating,
- generating a second sine signal and a second cosine signal characterizing the angular variations of the target relative to the sensor when the shaft is rotating, the first sine signal and the second sine signal being phase-shifted by a predetermined phase shift value, the first cosine signal and the second cosine signal being phase-shifted by a predetermined phase shift value,
- generating a first angle value signal representing a first angular position of the shaft on the basis of the first sine signal and the first cosine signal,
- generating a second angle value signal representing a second angular position of the shaft on the basis of the second sine signal and the second cosine signal,
- calculating the mean angular position of the shaft at a given time on the basis of the first angle value signal, the second angle value signal, and the predetermined phase shift value, according to the following formula:

if $$(SA1(t)+SA2(t)+DPH)<360, \quad \text{[Math 1]}$$

then:

$$PAM(t)=\frac{(SA1(t)+SA2(t)+DPH)}{2} \quad \text{[Math 2]}$$

if $$(SA1(t)+SA2(t)+DPH)>360, \quad \text{[Math 3]}$$

then:

$$PAM(t)=\frac{(SA1(t)+SA2(t)+DPH)-360}{2} \quad \text{[Math 4]}$$

where SA1(*t*) is the value of the first angle value signal at time t, SA2(*t*) is the value of the second angle value signal at time t, and DPH is the predetermined phase shift value.

The method according to an aspect of the invention makes it possible to correct the error generated by a misalignment and/or non-parallelism between the position sensor and the target by compensating for the deficiencies of the first angle value signal and the second angle value signal in order to calculate a mean angular position of the shaft that substantially corresponds to the actual angular position of said shaft.

Preferably, the first angle value signal is generated by taking the arc tangent of the ratio between the value of the first sine signal and the value of the first cosine signal, and the second angle value signal is generated by taking the arc tangent of the ratio between the value of the second sine signal and the value of the second cosine signal.

According to one aspect of the invention, the sensor comprising a first generation module and a second generation module, angularly offset relative to the first generation module by an angle equal to the predetermined phase shift value, the step of generating the first sine signal and the first cosine signal is performed by said first generation module and the step of generating the second sine signal and the second cosine signal is performed by said second generation module, the first sine signal and the first cosine signal characterizing the angular variations of the target relative to the first generation module when the shaft is rotating, and the second sine signal and the second cosine signal characterizing the angular variations of the target relative to the second generation module when the shaft is rotating.

According to another aspect of the invention, the sensor comprising at least a first generation module, the step of generating the first sine signal and the first cosine signal is performed by said first generation module on the basis of the variations in electromagnetic field direction generated by the rotation of the target, and the step of generating the second sine signal and the second cosine signal is performed by said first generation module or by an electronic control unit on the basis of the first sine signal and the first cosine signal.

Preferably, the predetermined phase shift value is 90°. As a variant, the predetermined phase shift value can be 45°.

An aspect of the invention also relates to a computer program product, characterized in that it comprises a set of program code instructions, which, when they are executed by one or more processors, configure the one or more processors to implement a method as described above.

An aspect of the invention also relates to a position sensor suitable for being mounted facing a magnetic target fixed at the end of a rotary shaft of a motor vehicle, said sensor being configured to implement the method as described above.

According to one aspect of the invention, the sensor comprises a first generation module, configured to generate the first sine signal and the first cosine signal, and a second generation module, angularly offset relative to the first generation module by an angle equal to the predetermined phase shift value and configured to generate the second sine signal and the second cosine signal, the first sine signal and the first cosine signal characterizing the angular variations of the target relative to the first generation module when the shaft is rotating, and the second sine signal and the second cosine signal characterizing the angular variations of the target relative to the second generation module when the shaft is rotating.

In one embodiment, the sensor comprises:

a first signal generation module configured to generate a first sine signal and a first cosine signal characterizing the angular variations of the target relative to said first generation module when the shaft is rotating, and a first angle value signal representing a first angular position of the shaft on the basis of the first sine signal and the second cosine signal, a second generation module configured to generate a second sine signal and a second cosine signal characterizing the angular variations of the target relative to said second generation module when the shaft is rotating, the first sine signal and the second sine signal being phase-shifted by a predetermined phase shift value, the first cosine signal and the second cosine signal being phase-shifted by a predetermined phase shift value, and a second angle value signal representing a second angular position of the shaft on the basis of the second sine signal and the second cosine signal, and is configured to calculate the mean angular position of the shaft on the basis of the first angle value signal, the second angle value signal, and the predetermined phase shift value.

In another embodiment, the sensor comprises:

a first signal generation module configured to generate a first sine signal and a first cosine signal characterizing the angular variations of the target relative to said first generation module when the shaft is rotating, and to send the first sine signal and the first cosine signal to an electronic control unit of the vehicle, a second generation module configured to generate a second sine signal and a second cosine signal characterizing the angular variations of the target relative to said second generation module when the shaft is rotating, the first sine signal and the second sine signal being phase-shifted by a predetermined phase shift value, the first cosine signal and the second cosine signal being phase-shifted by a predetermined phase shift value, and to send the second sine signal and the second cosine signal to an electronic control unit of the vehicle.

In this case, the sensor interacts with the electronic control unit, which is configured to:

receive the first sine signal, the first cosine signal, the second sine signal, and the second cosine signal, generate a first angle value signal representing a first angular position of the shaft on the basis of the first sine signal and the first cosine signal, generate a second angle value signal representing a second angular position of the shaft on the basis of the second sine signal and the second cosine signal, calculate the mean angular position of the shaft on the basis of the first angle value signal, the second angle value signal, and the predetermined phase shift value.

Advantageously, the sensor comprises at least a first generation module configured to generate the first sine signal and the first cosine signal on the basis of the variations in electromagnetic field direction generated by the rotation of the target and to generate the second sine signal and the second cosine signal on the basis of the first sine signal and the first cosine signal, or to transmit the first sine signal and the first cosine signal to an electronic control unit so that said electronic control unit generates the second sine signal and the second cosine signal on the basis of the first sine signal and the first cosine signal.

Preferably, the predetermined phase shift value is 90°. As a variant, the predetermined phase shift value can be 45°.

An aspect of the invention also relates to an electronic control unit configured to:

receive from a sensor as described above the first angle value signal and the second angle value signal, calculate the mean angular position of the shaft at a given time t on the basis of the value of the first angle value signal, the value of the second angle value signal, and the predetermined phase shift value, according to the following formula:

if $$(SA1(t)+SA2(t)+DPH)<360, \quad \text{[Math 5]}$$

then:

$$PAM(t)=\frac{(SA1(t)+SA2(t)+DPH)}{2} \quad \text{[Math 6]}$$

if $$(SA1(t)+SA2(t)+DPH)>360, \quad \text{[Math 7]}$$

then:

$$PAM(t)=\frac{(SA1(t)+SA2(t)+DPH)-360}{2} \quad \text{[Math 8]}$$

where SA1(*t*) is the value of the first angle value signal at time t, SA2(*t*) is the value of the second angle value signal at time t, and DPH is the predetermined phase shift value.

An aspect of the invention also relates to an electronic control unit configured to:

receive from a sensor as described above the first sine signal, the first cosine signal, the second sine signal and the second cosine signal, generate a first angle value signal representing a first angular position of the shaft on the basis of the first sine signal and the first cosine signal, generate a second angle value signal representing a second angular position of the shaft on the basis of the second sine signal and the second cosine signal, calculate the mean angular position of the shaft at a given time t on the basis of the value of the first angle value signal, the value of the second angle value signal, and the predetermined phase shift value, according to the following formula:

if $$(SA1(t)+SA2(t)+DPH)<360, \quad \text{[Math 9]}$$

then:

$$PAM(t)=\frac{(SA1(t)+SA2(t)+DPH)}{2} \quad \text{[Math 10]}$$

if $$(SA1(t)+SA2(t)+DPH)>360, \quad \text{[Math 11]}$$

then:

$$PAM(t)=\frac{(SA1(t)+SA2(t)+DPH)-360}{2} \quad \text{[Math 12]}$$

where SA1(*t*) is the value of the first angle value signal at time t, SA2(*t*) is the value of the second angle value signal at time t, and DPH is the predetermined phase shift value.

An aspect of the invention also relates to an electronic control unit configured to:

receive from a sensor as described above the first sine signal and the first cosine signal, generate a first angle value signal representing a first angular position of the shaft on the basis of the first sine signal and the first cosine signal, simulate a second sine signal and a second cosine signal on the basis of the first sine signal received and the first cosine signal received, generate a second angle value signal representing a second angular position of the shaft on the basis of the second sine signal simulated and the second cosine signal simulated, calculate the mean angular position of the shaft at a given time t on the basis of the value of the first angle value signal, the value of the second angle value signal, and the predetermined phase shift value, according to the following formula:

if $$(SA1(t)+SA2(t)+DPH)<360, \quad \text{[Math 13]}$$

then:

$$PAM(t)=\frac{(SA1(t)+SA2(t)+DPH)}{2} \quad \text{[Math 14]}$$

if $$(SA1(t)+SA2(t)+DPH)>360, \quad \text{[Math 15]}$$

then:

$$PAM(t)=\frac{(SA1(t)+SA2(t)+DPH)-360}{2} \quad \text{[Math 16]}$$

where SA1(*t*) is the value of the first angle value signal at time t, SA2(*t*) is the value of the second angle value signal at time t, and DPH is the predetermined phase shift value.

An aspect of the invention also relates to a motor vehicle comprising at least one rotary shaft, comprising a target fixed at one of its ends, and at least one position sensor, as described above, mounted facing said target.

An aspect of the invention also relates to a motor vehicle comprising:

an electronic control unit, at least one rotary shaft comprising a target fixed at one of its ends and comprising at least one magnetic element, a magnetoresistive position sensor, mounted facing said target and connected by at least one communication link to the electronic control unit, the sensor being configured to:

generate a first sine signal and a first cosine signal characterizing the angular variations of the target when the shaft is rotating, and to send the first sine signal and the first cosine signal to the electronic control unit, generate a second sine signal and a second cosine signal characterizing the angular variations of the target when the shaft is rotating, the first sine signal and the second sine signal being phase-shifted by a predetermined phase shift value, the first cosine signal and the second cosine signal being phase-shifted by a predetermined phase shift value, generate a first angle value signal representing a first angular position of the shaft on the basis of the first sine signal and the first cosine signal, generate a second angle value signal representing a second angular position of the shaft on the basis of the second sine signal and the second cosine signal, send the first angle value signal and the second angle value signal to the electronic control unit, the electronic control unit being configured to:

receive from the sensor the first angle value signal and the second angle value signal, calculate the mean angular position of the shaft at a given time t on the basis of the value of the first angle value signal, the value of the second angle value signal, and the predetermined phase shift value, according to the following formula:

if $$(SA1(t)+SA2(t)+DPH)<360, \qquad \text{[Math 17]}$$

then:

$$PAM(t)=\frac{(SA1(t)+SA2(t)+DPH)}{2} \qquad \text{[Math 18]}$$

if $$(SA1(t)+SA2(t)+DPH)>360, \qquad \text{[Math 19]}$$

then:

$$PAM(t)=\frac{(SA1(t)+SA2(t)+DPH)-360}{2} \qquad \text{[Math 20]}$$

where SA1(*t*) is the value of the first angle value signal at time t, SA2(*t*) is the value of the second angle value signal at time t, and DPH is the predetermined phase shift value.

An aspect of the invention also relates to a motor vehicle comprising:

an electronic control unit, at least one rotary shaft comprising a target fixed at one of its ends and comprising at least one magnetic element, a magnetoresistive position sensor, mounted facing said target and connected by at least one communication link to the electronic control unit, the sensor being configured to:

generate a first sine signal and a first cosine signal characterizing the angular variations of the target when the shaft is rotating, and to send the first sine signal and the first cosine signal to the electronic control unit, generate a second sine signal and a second cosine signal characterizing the angular variations of the target when the shaft is rotating, the first sine signal and the second sine signal being phase-shifted by a predetermined phase shift value, the first cosine signal and the second cosine signal being phase-shifted by a predetermined phase shift value, send the first sine signal, the first cosine signal, the second sine signal and the second cosine signal generated to the electronic control unit, the electronic control unit being configured to:

receive from the sensor the first sine signal, the first cosine signal, the second sine signal, and the second cosine signal, generate a first angle value signal representing a first angular position of the shaft on the basis of the first sine signal and the first cosine signal, generate a second angle value signal representing a second angular position of the shaft on the basis of the second sine signal and the second cosine signal, calculate the mean angular position of the shaft at a given time t on the basis of the value of the first angle value signal, the value of the second angle value signal, and the predetermined phase shift value, according to the following formula:

if $$(SA1(t)+SA2(t)+DPH)<360, \qquad \text{[Math 21]}$$

then:

$$PAM(t)=\frac{(SA1(t)+SA2(t)+DPH)}{2} \qquad \text{[Math 22]}$$

if $$(SA1(t)+SA2(t)+DPH)>360, \qquad \text{[Math 23]}$$

then:

$$PAM(t)=\frac{(SA1(t)+SA2(t)+DPH)-360}{2} \qquad \text{[Math 24]}$$

where SA1(*t*) is the value of the first angle value signal at time t, SA2(*t*) is the value of the second angle value signal at time t, and DPH is the predetermined phase shift value.

An aspect of the invention also relates to a motor vehicle comprising:

an electronic control unit, at least one rotary shaft comprising a target fixed at one of its ends and comprising at least one magnetic element, a magnetoresistive position sensor, mounted facing said target and connected by at least one communication link to the electronic control unit, the sensor being configured to generate a first sine signal and a first cosine signal characterizing the angular variations of the target when the shaft is rotating, and to send the first sine signal and the first cosine signal to the electronic control unit, the electronic control unit being configured to:

receive from the sensor the first sine signal and the first cosine signal, simulate a second sine signal and a second cosine signal characterizing the angular variations of the target when the shaft is rotating on the basis of the first sine signal and the first cosine signal received, the first sine signal and the second sine signal being phase-shifted by a predetermined phase shift value, the first cosine signal and the second cosine signal being phase-shifted by a predetermined phase shift value, generate a first angle value signal representing a first angular position of the shaft on the basis of the first sine signal and the first cosine signal, generate a second angle value signal representing a second angular position of the shaft on the basis of the second sine signal and the second cosine signal, calculate the mean angular position of the shaft at a given time t on the basis of the value of the first angle value signal, the value of the second angle value signal, and the predetermined phase shift value, according to the following formula:

if $$(SA1(t)+SA2(t)+DPH)<360, \quad \text{[Math 25]}$$

then:

$$PAM(t)=\frac{(SA1(t)+SA2(t)+DPH)}{2} \quad \text{[Math 26]}$$

if $$(SA1(t)+SA2(t)+DPH)>360, \quad \text{[Math 27]}$$

then:

$$PAM(t)=\frac{(SA1(t)+SA2(t)+DPH)-360}{2} \quad \text{[Math 28]}$$

where SA1(*t*) is the value of the first angle value signal at time t, SA2(*t*) is the value of the second angle value signal at time t, and DPH is the predetermined phase shift value.

BRIEF DESCRIPTION OF THE DRAWINGS

Other features and advantages of aspects of the invention will become more clearly apparent on reading the following description. This description is purely illustrative and must be read with reference to the appended drawings, in which.

DETAILED DESCRIPTION OF EXEMPLARY EMBODIMENTS

Figure 1:
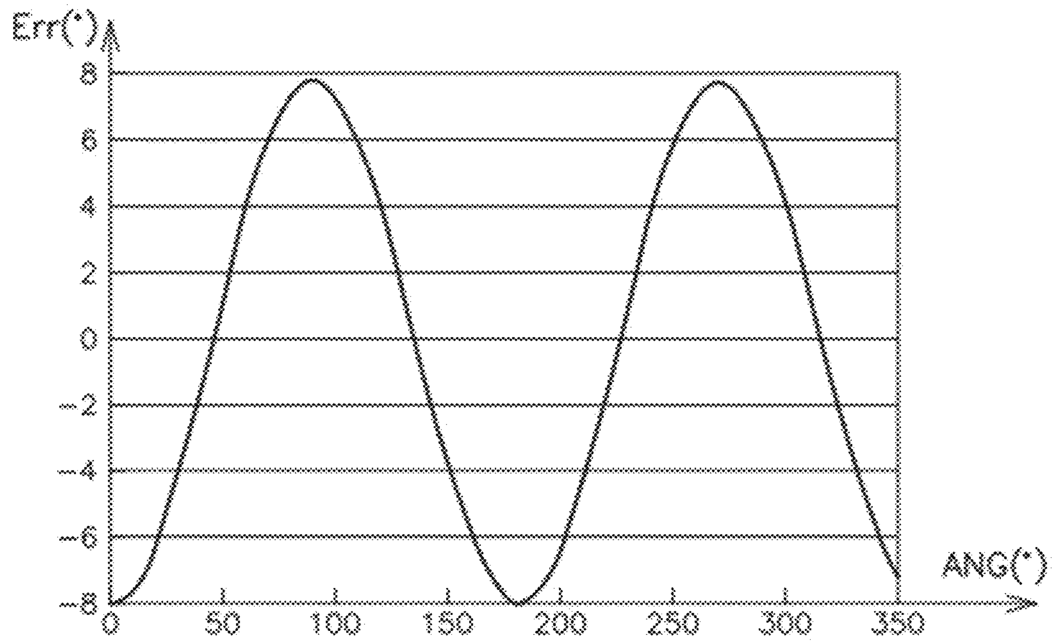
FIG. 1 illustrates an example of a signal representing the error between the angular position of a shaft calculated by a position sensor and the actual angle of the shaft in the absence of correction.
Figure 2:
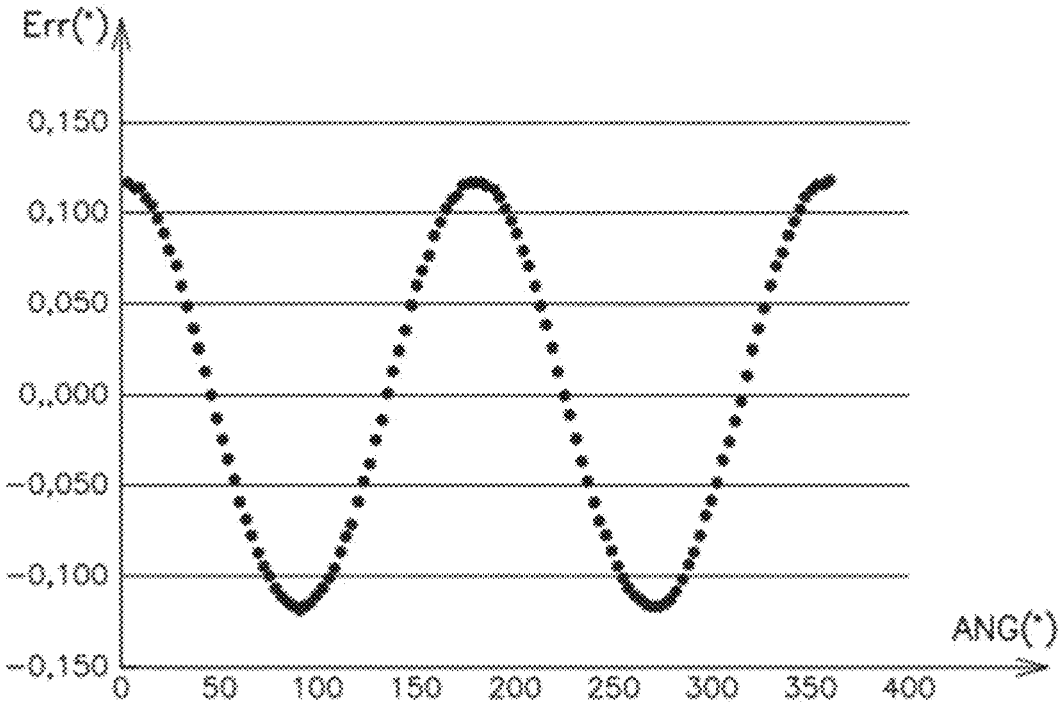
FIG. 2 illustrates an example of a signal representing the error between the angular position of a shaft calculated by a position sensor and the actual angle of the shaft following correction by a prior art solution.
Figure 3:
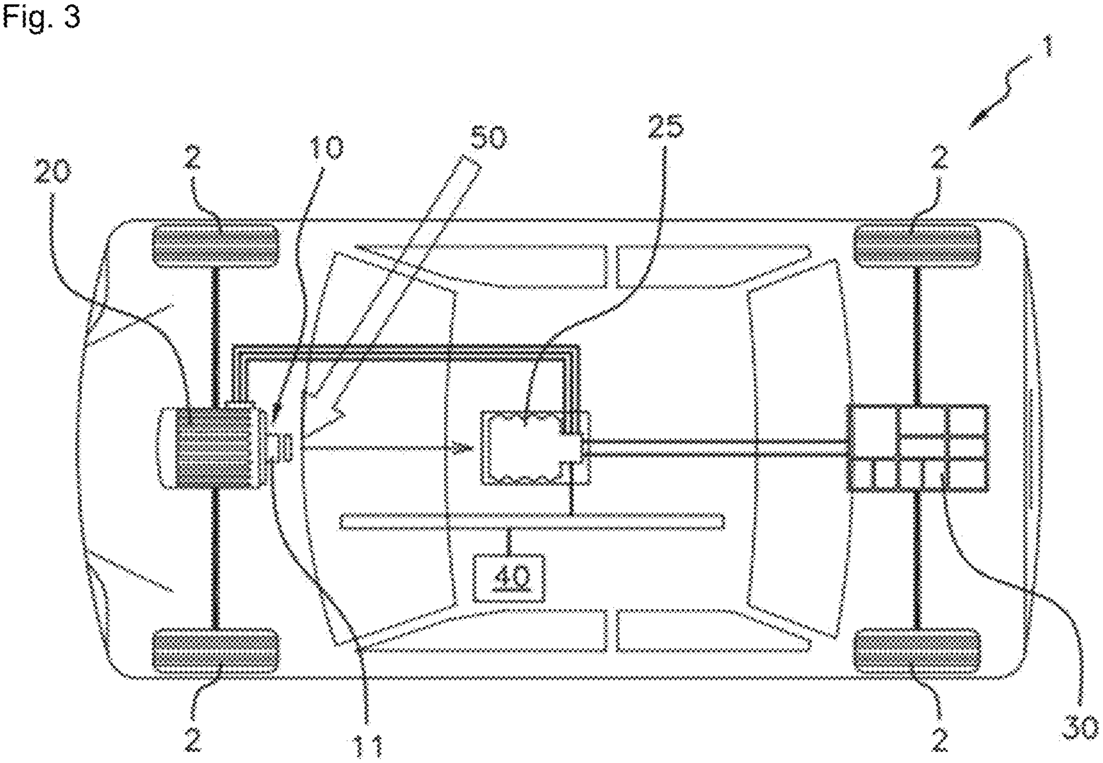
FIG. 3 schematically illustrates one embodiment of the motor vehicle according to the invention.

FIG. 3 schematically shows an example of a vehicle 1 according to an aspect of the invention. In this example, the vehicle 1 is an electric vehicle comprising an electric drive machine comprising a rotor 10 and a stator 20. The electric machine is powered by an electric battery 30 and is controlled by an electronic control unit 40 via a converter 25 and using a sensor 50.

The rotor 10 comprises a rotary central shaft 11 making it possible to drive the wheels 2 of the vehicle 1 via a transmission line (not shown for the sake of clarity). It will be noted that in this example, the shaft 11 is a shaft of a rotor 10 but this in no way limits the scope of an aspect of the present invention, and the shaft 11 can be any type of rotary shaft of a motor vehicle.

Figure 4A:
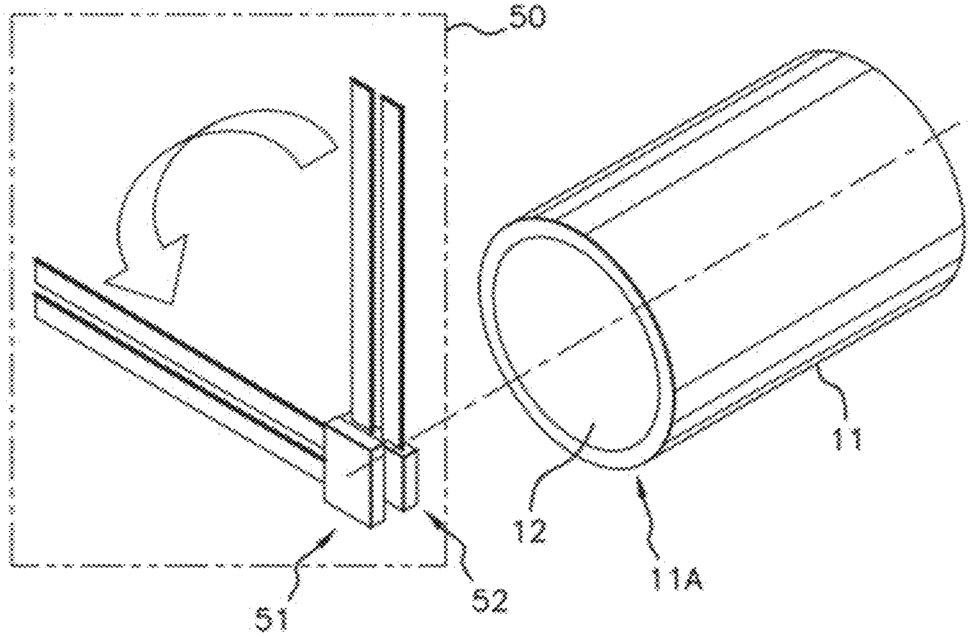
FIG. 4A schematically illustrates a first arrangement of a shaft and a position sensor.
Figure 4B:
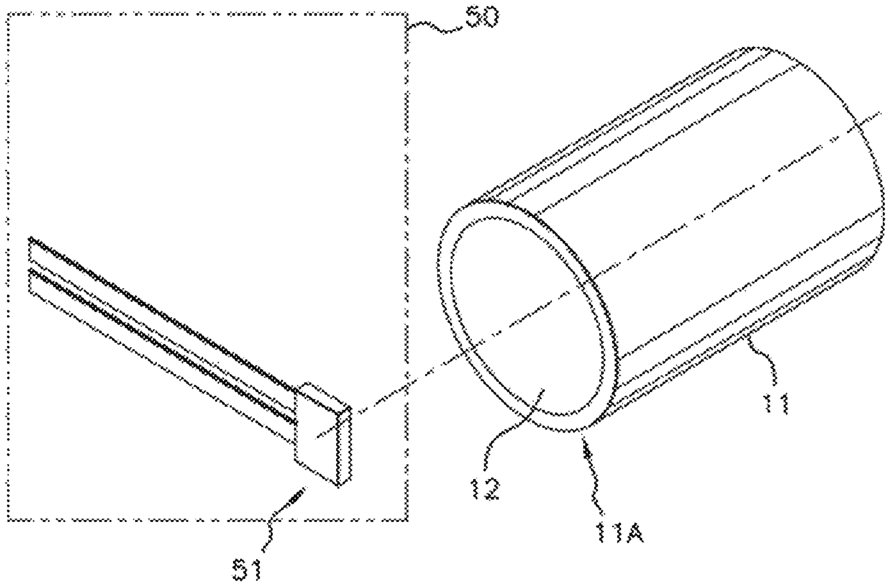
FIG. 4B schematically illustrates a second arrangement of a shaft and a position sensor.

With reference to FIGS. 4A and 4B, the shaft 11 takes the form of a rod extending in a longitudinal direction from the body of the rotor 10 and comprising a free end 11A. Such a shaft 11 can for example be a crankshaft or a camshaft.

The free end 11A of the shaft 11 comprises a target 12, taking the form of a disk for example, mounted coaxially with the shaft 11, that is, the center of the target 12 is coincident with the longitudinal axis of the shaft 11. The target 12 comprises a centered magnetic element at its center. This magnetic element can be a portion of the target 12 or an additional element fixed in the center of the target 12.

According to an aspect of the invention, two types of configuration are possible:

- a first "physical" configuration, in which the sensor 50 generates two pairs of sine and cosine signals by measuring the variations in electromagnetic field direction of the target 12,
- a second "virtual" configuration, in which the sensor 50 generates one pair of "actual" sine and cosine signals by measuring the variations in electromagnetic field direction of the target 12, the second "virtual" pair of sine and cosine signals being constructed by the sensor 50 or by the electronic control unit 40 on the basis of the pair of "actual" sine and cosine signals.

I. First Configuration

An example of a sensor in the first configuration is given with reference to FIG. 4A. The sensor 50 comprises a housing (not shown for the sake of clarity) in which are mounted a first generation module 51 and a second generation module 52. The description given below also relates to FIGS. 5 to 7 with respect to reference signs SIN1, COS1, SIN2, COS2, SA1, SA2, and PAM.

The first generation module 51 is configured to generate a first sine signal SIN1 and a first cosine signal COS1 characterizing the angular variations of the target 12 relative to said first generation module 51 when the shaft 11 is rotating.

The second generation module 52 is configured to generate a second sine signal SIN2 and a second cosine signal COS2 characterizing the angular variations of the target 12 relative to said second generation module 52 when the shaft 11 is rotating.

The first sine signal SIN1 and the second sine signal SIN2 are phase-shifted by a predetermined phase shift value DPH. Likewise, the first cosine signal COS1 and the second cosine signal COS2 are phase-shifted by the same predetermined phase shift value DPH.

Preferably, the first generation module 51 and the second generation module 52 each comprise an electronic circuit comprising magnetoresistors, preferably Wheatstone bridges, substantially centered relative to the target 12, to within a centering tolerance resulting from mounting.

The first generation module 51 and the second generation module 52 are arranged relative to each other rotated angularly by an offset value, preferably of 45° or 90°. This mechanical offset makes it possible to create a phase shift DPH of the same value (preferably 45° or) 90° between the first sine signal SIN1 and the second sine signal SIN2, and between the first cosine signal COS1 and the second cosine signal COS2.

In the embodiment illustrated in FIG. 4A, the sensor 50 comprises a first electronic circuit, on which is mounted the first generation module 51, and a second electronic circuit, on which is mounted the second generation module 52. The first electronic circuit and the second electronic circuit are substantially parallel to each other and to the target, to within a parallelism tolerance resulting from mounting.

In another embodiment, the sensor 50 comprises a single electronic circuit mounted in line with, that is facing, the target 12, substantially coaxially and parallel, and on which are mounted both the first generation module 51 and the second generation module 52.

"Substantially" is given to mean that a misalignment tolerance is permitted between the measurement center of the sensor 50 and the center of the target 12 (or the longitudinal axis of the shaft 11), for example up to 1 mm, and/or that a parallelism tolerance between the plane of the electronic circuit(s) of the sensor and the plane of the target is permitted, for example up to 1 mm. This tolerance depends on the mounting of the sensor 50 and the centering of the target 12.

The sensor 50 can be a magnetic sensor, in particular a TMR (tunnel magnetoresistance), GMR or AMR sensor, or any other type of suitable position sensor.

First Embodiment

In this embodiment, the first generation module 51 is configured to generate a first angle value signal SA1 representing a first angular position of the shaft 11 on the basis of the first sine signal SIN1 and the first cosine signal COS1.

The second generation module 52 is configured to generate a second angle value signal SA2 representing a second angular position of the shaft 11 on the basis of the second sine signal SIN2 and the second cosine signal COS2.

The sensor 50 is configured to calculate the mean angular position PAM of the shaft 11 at a given time t on the basis of the value of the first angle value signal SA1, the value of the second angle value signal SA2, and the predetermined phase shift value DPH.

Preferably, the sensor 50 is configured to calculate the mean angular position of the shaft 11 according to the following formula:

if $$(SA1(t)+SA2(t)+DPH)<360, \quad \text{[Math 29]}$$

then:

$$PAM(t)=\frac{(SA1(t)+SA2(t)+DPH)}{2} \quad \text{[Math 30]}$$

if $$(SA1(t)+SA2(t)+DPH)>360 \quad \text{[Math 31]}$$

then:

$$PAM(t)=\frac{(SA1(t)+SA2(t)+DPH)-360}{2} \quad \text{[Math 32]}$$

where SA1(*t*) is the value of the first angle value signal at time t, SA2(*t*) is the value of the second angle value signal at time t, and DPH is the predetermined phase shift value.

The sensor 50 comprises a processor capable of implementing a set of instructions allowing these functions to be performed.

Second Embodiment

In this embodiment, the first generation module 51 is configured to generate a first angle value signal SA1 representing a first angular position of the shaft 11 on the basis of the first sine signal SIN1 and the first cosine signal COS1, and to send said first angle value signal SA1 to the electronic control unit 40.

The second generation module 52 is configured to generate a second angle value signal SA2 representing a second angular position of the shaft 11 on the basis of the second sine signal SIN2 and the second cosine signal COS2, and to send said second angle value signal SA2 to the electronic control unit 40.

The sensor 50 comprises a processor capable of implementing a set of instructions allowing these functions to be performed.

The electronic control unit 40 is configured to receive the first angle value signal SA1 and the second angle value signal SA2 and to calculate the mean angular position PAM of the shaft 11 at a given time t on the basis of the value of the first angle value signal SA1, the value of the second angle value signal SA2, and the predetermined phase shift value DPH.

Preferably, the electronic control unit 40 is configured to calculate the mean angular position of the shaft 11 according to the following formula:

if $$(SA1(t)+SA2(t)+DPH)<360, \quad \text{[Math 33]}$$

then:

$$PAM(t)=\frac{(SA1(t)+SA2(t)+DPH)}{2} \quad \text{[Math 34]}$$

if $$(SA1(t)+SA2(t)+DPH)>360, \quad \text{[Math 35]}$$

-continued then:

$$PAM(t) = \frac{(SA1(t) + SA2(t) + DPH) - 360}{2} \quad \text{[Math 36]}$$

where SA1(*t*) is the value of the first angle value signal at time t, SA2(*t*) is the value of the second angle value signal at time t, and DPH is the predetermined phase shift value.

The electronic control unit 40 comprises a processor capable of implementing a set of instructions allowing these functions to be performed.

Third Embodiment

In this embodiment, the first generation module 51 is configured to send the first sine signal SIN1 and the first cosine signal COS1 to the electronic control unit 40, and the second generation module 52 is configured to send the second sine signal SIN2 and the second cosine signal COS2 to the electronic control unit 40.

The sensor 50 comprises a processor capable of implementing a set of instructions allowing these functions to be performed.

The electronic control unit 40 is configured to receive the first sine signal SIN1, the first cosine signal COS1, the second sine signal SIN2, and the second cosine signal COS2.

The electronic control unit 40 is configured to generate a first angle value signal SA1 representing a first angular position of the shaft 11 on the basis of the first sine signal SIN1 and the first cosine signal COS1, and a second angle value signal SA2 representing a second angular position of the shaft 11 on the basis of the second sine signal SIN2 and the second cosine signal COS2.

The electronic control unit 40 is configured to calculate the mean angular position PAM of the shaft 11 at a given time t on the basis of the value of the first angle value signal SA1 at time t, the value of the second angle value signal SA2 at time t, and the predetermined phase shift value DPH.

The electronic control unit 40 comprises a processor capable of implementing a set of instructions allowing these functions to be performed.

Exemplary Embodiments

Three exemplary embodiments will now be described with reference to FIGS. 5 to 7 for the three embodiments described above.

Steps E1 and E2 are common to all three embodiments.

First, the shaft 11 is rotated in a step E1.

In a step E2, the first generation module 51 generates a first sine signal SIN1 and a first cosine signal COS1 characterizing the angular variations of the target 12 relative to said first generation module 51 when the shaft 11 is rotating, and the second generation module 52 generates a second sine signal SIN2 and a second cosine signal COS2 characterizing the angular variations of the target 12 relative to said second generation module 52 when the shaft 11 is rotating. This generation of sine and cosine signals on the basis of the variations in electromagnetic field direction generated by the rotating target 12 is known per se and will not be described in greater detail here.

Figure 5:
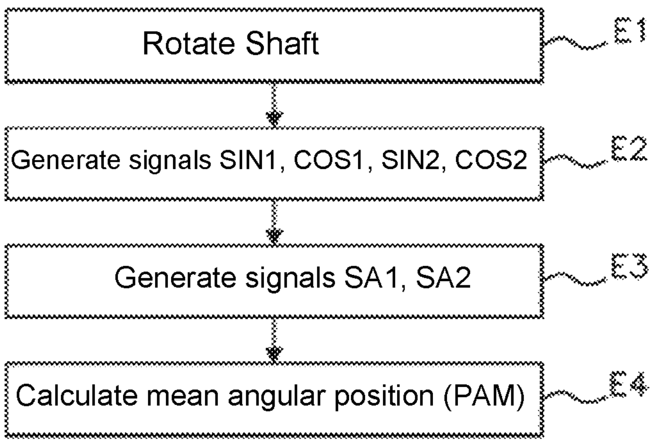
FIG. 5 schematically illustrates a first embodiment of the method according to the invention.

First Embodiment (FIG. 5)

Following step E2, in a step E3, the first generation module 51 generates a first angle value signal SA1 representing a first angular position of the shaft 11 on the basis of the first sine signal SIN1 and the first cosine signal COS1, and the second generation module 52 generates a second angle value signal SA2 representing a second angular position of the shaft 11 on the basis of the second sine signal SIN2 and the second cosine signal COS2.

In a step E4, the sensor 50 calculates the mean angular position PAM of the shaft on the basis of the first angle value signal SA1, the second angle value signal SA2, and the predetermined phase shift value DPH, according to the following formula:

if $$(SA1(t) + SA2(t) + DPH) < 360, \quad \text{[Math 37]}$$

then:

$$PAM(t) = \frac{(SA1(t) + SA2(t) + DPH)}{2} \quad \text{[Math 38]}$$

if $$(SA1(t) + SA2(t) + DPH) > 360, \quad \text{[Math 39]}$$

then:

$$PAM(t) = \frac{(SA1(t) + SA2(t) + DPH) - 360}{2} \quad \text{[Math 40]}$$

where SA1(*t*) is the value of the first angle value signal at time t, SA2(*t*) is the value of the second angle value signal at time t, and DPH is the predetermined phase shift value.

Figure 6:
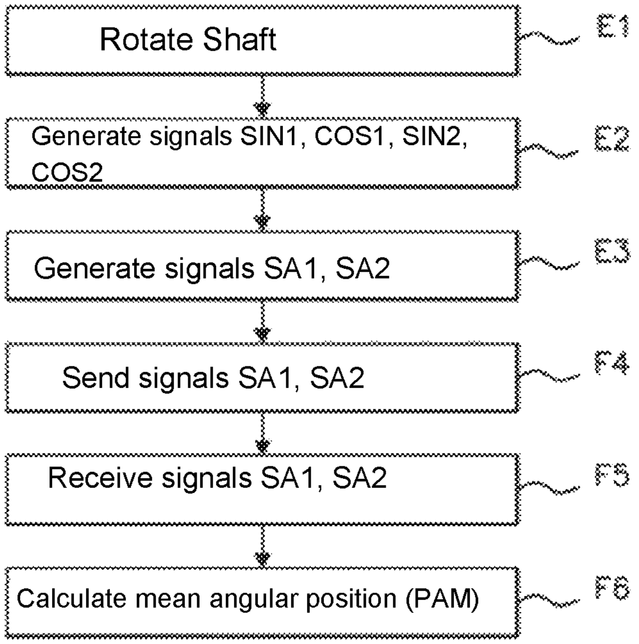
FIG. 6 schematically illustrates a second embodiment of the method according to the invention.

Second Embodiment (FIG. 6)

Following step E2, in a step E3, the first generation module 51 generates a first angle value signal SA1 representing a first angular position of the shaft 11 on the basis of the first sine signal SIN1 and the first cosine signal COS1, and the second generation module 52 generates a second angle value signal SA2 representing a second angular position of the shaft 11 on the basis of the second sine signal SIN2 and the second cosine signal COS2.

In a step F4, the first generation module 51 sends the first angle value signal SA1 to the electronic control unit 40 and the second generation module 52 sends the second angle value signal SA2 to the electronic control unit 40.

In a step F5, the electronic control unit 40 receives the first angle value signal SA1 and the second angle value signal SA2.

In a step F6, the electronic control unit 40 calculates the mean angular position PAM of the shaft on the basis of the first angle value signal SA1, the second angle value signal SA2, and the predetermined phase shift value DPH, according to the following formula:

if $$(SA1(t) + SA2(t) + DPH) < 360, \quad \text{[Math 41]}$$

then:

$$PAM(t) = \frac{(SA1(t) + SA2(t) + DPH)}{2} \quad \text{[Math 42]}$$

if $$(SA1(t) + SA2(t) + DPH) > 360, \quad \text{[Math 43]}$$

-continued then:

$$PAM(t) = \frac{(SA1(t) + SA2(t) + DPH) - 360}{2} \quad \text{[Math 44]}$$

where SA1(*t*) is the value of the first angle value signal at time t, SA2(*t*) is the value of the second angle value signal at time t, and DPH is the predetermined phase shift value.

Figure 7:
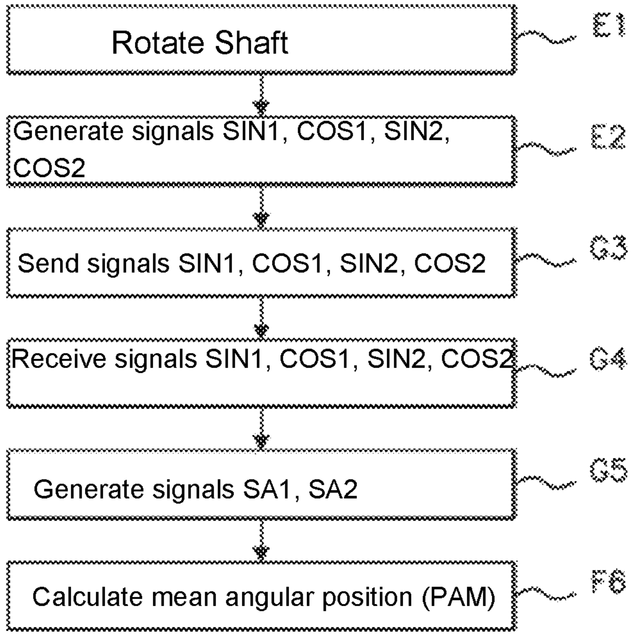
FIG. 7 schematically illustrates a third embodiment of the method according to the invention.

Third Embodiment (FIG. 7)

Following step E2, in a step G3, the first generation module 51 sends the first sine signal SIN1 and the first cosine signal COS1 to the electronic control unit 40 and the second generation module 52 sends the second sine signal SIN2 and the second cosine signal COS2 to the electronic control unit 40.

In a step G4, the electronic control unit 40 receives the first sine signal SIN1, the first cosine signal COS1, the second sine signal SIN2, and the second cosine signal COS2, and generates in a step G5 a first angle value signal SA1 representing a first angular position of the shaft 11 on the basis of the first sine signal SIN1 and the first cosine signal COS1, and a second angle value signal SA2 representing a second angular position of the shaft 11 on the basis of the second sine signal SIN2 and the second cosine signal COS2.

In a step F6, the electronic control unit 40 calculates the mean angular position PAM of the shaft 11 on the basis of the first angle value signal SA1, the second angle value signal SA2, and the predetermined phase shift value according to the following formula:

if $$(SA1(t) + SA2(t) + DPH) < 360, \quad \text{[Math 45]}$$

then:

$$PAM(t) = \frac{(SA1(t) + SA2(t) + DPH)}{2} \quad \text{[Math 46]}$$

if $$(SA1(t) + SA2(t) + DPH) > 360, \quad \text{[Math 47]}$$

then:

$$PAM(t) = \frac{(SA1(t) + SA2(t) + DPH) - 360}{2} \quad \text{[Math 48]}$$

where SA1(*t*) is the value of the first angle value signal at time t, SA2(*t*) is the value of the second angle value signal at time t, and DPH is the predetermined phase shift value.

I. Second Configuration

An example of a sensor 50 in the second configuration is given with reference to FIG. 4B. The sensor 50 comprises a housing (not shown for the sake of clarity) in which is mounted at least a first generation module 51.

Preferably, the first generation module 51 comprises an electronic circuit, preferably a Wheatstone bridge magnetoresistor circuit, substantially centered relative to the target 12, to within a centering tolerance resulting from mounting.

"Substantially" is given to mean that a misalignment tolerance is permitted between the measurement center of the first generation module 51 and the center of the target 12 (or the longitudinal axis of the shaft 11), for example up to 1 mm.

The sensor 50 can be a magnetic sensor, in particular a TMR (tunnel magnetoresistance), GMR or AMR sensor, or any other type of suitable position sensor.

The first generation module 51 is configured to generate a first sine signal SIN1 and a first cosine signal COS1 characterizing the angular variations of the target 12 relative to said first generation module 51 when the shaft 11 is rotating.

First Embodiment

In this embodiment, the sensor 50 is configured to simulate (i.e. construct) a second sine signal SIN2 and a second cosine signal COS2 on the basis of the first sine signal SIN1 and the first cosine signal COS1. The first sine signal SIN1 and the second sine signal SIN2 are phase-shifted by a predetermined phase shift value DPH. Likewise, the first cosine signal COS1 and the second cosine signal COS2 are phase-shifted by the same predetermined phase shift value DPH.

"Simulate" or "construct" is given to mean that the sensor 50 uses the values of the first sine signal SIN1 and the first cosine signal COS1 generated at a time t and at a subsequent time t+1, where the time interval between t and t+1 corresponds to the predetermined phase shift value DPH. In practice, the amplitude values of the first sine signal SIN1 and the first cosine signal COS1 are stored in a first column of a table in a memory zone (not shown) of the sensor 50, for subsequent use, and the amplitude values of the second sine signal SIN2 and the second cosine signal COS2 are created by copying the amplitude values of the first sine signal SIN1 and the first cosine signal COS1 into a second column of the table but offsetting them in the lower rows so that, in a single row, the values correspond to the SIN1 and COS1 signals phase-shifted by the predetermined phase value, preferably 90°. This copying of the amplitude values of the first sine signal SIN1 and the first cosine signal COS1 involves an initialization phase, during which the second column of the table does not contain any values for a period of time corresponding to the acquisition of the first amplitude values of the first sine signal SIN1 and the first cosine signal COS1 for the duration of the predetermined phase shift value DPH.

The sensor 50 is configured to generate a first angle value signal SA1 representing a first angular position of the shaft 11 on the basis of the first sine signal SIN1 and the first cosine signal COS1.

The sensor 50 is configured to generate a second angle value signal SA2 representing a second angular position of the shaft 11 on the basis of the second sine signal SIN2 and the second cosine signal COS2, the first sine signal SIN1 and the second sine signal SIN2 being phase-shifted by a predetermined phase shift value DPH and the first cosine signal COS1 and the second cosine signal COS2 being phase-shifted by a predetermined phase shift value DPH.

The sensor 50 is configured to calculate the mean angular position PAM of the shaft 11 at a given time t on the basis of the value of the first angle value signal SA1, the value of the second angle value signal SA2, and the predetermined phase shift value DPH.

The sensor 50 is configured to calculate the mean angular position of the shaft 11 according to the following formula:

if $$(SA1(t)+SA2(t)+DPH)<360, \quad \text{[Math 49]}$$

then:

$$PAM(t)=\frac{(SA1(t)+SA2(t)+DPH)}{2} \quad \text{[Math 50]}$$

if $$(SA1(t)+SA2(t)+DPH)>360, \quad \text{[Math 51]}$$

then:

$$PAM(t)=\frac{(SA1(t)+SA2(t)+DPH)-360}{2} \quad \text{[Math 52]}$$

where SA1(*t*) is the value of the first angle value signal at time t, SA2(*t*) is the value of the second angle value signal at time t, and DPH is the predetermined phase shift value.

The sensor 50 comprises a processor capable of implementing a set of instructions allowing these functions to be performed.

Second Embodiment

In this embodiment, the sensor 50 is configured to simulate (i.e. construct) a second sine signal SIN2 and a second cosine signal COS2 on the basis of the first sine signal SIN1 and the first cosine signal COS1 in the same way as in the preceding embodiment.

The sensor 50 is configured to generate a first angle value signal SA1 representing a first angular position of the shaft 11 on the basis of the first sine signal SIN1 and the first cosine signal COS1, and to send said first angle value signal SA1 to the electronic control unit 40.

The sensor 50 is configured to generate a second angle value signal SA2 representing a second angular position of the shaft 11 on the basis of the second sine signal SIN2 and the second cosine signal COS2 and to send said second angle value signal SA2 to the electronic control unit 40.

The sensor 50 comprises a processor capable of implementing a set of instructions allowing these functions to be performed.

The electronic control unit 40 is configured to receive the first angle value signal SA1 and the second angle value signal SA2 and to calculate the mean angular position PAM of the shaft 11 at a given time t on the basis of the value of the first angle value signal SA1, the value of the second angle value signal SA2, and the predetermined phase shift value DPH.

The electronic control unit 40 is configured to calculate the mean angular position of the shaft 11 according to the following formula:

if $$(SA1(t)+SA2(t)+DPH)<360, \quad \text{[Math 53]}$$

then:

$$PAM(t)=\frac{(SA1(t)+SA2(t)+DPH)}{2} \quad \text{[Math 54]}$$

if $$(SA1(t)+SA2(t)+DPH)>360, \quad \text{[Math 55]}$$

-continued then:

$$PAM(t)=\frac{(SA1(t)+SA2(t)+DPH)-360}{2} \quad \text{[Math 56]}$$

where SA1(*t*) is the value of the first angle value signal at time t, SA2(*t*) is the value of the second angle value signal at time t, and DPH is the predetermined phase shift value.

The electronic control unit 40 comprises a processor capable of implementing a set of instructions allowing these functions to be performed.

Third Embodiment

In this embodiment, the sensor 50 is configured to simulate (i.e. construct) a second sine signal SIN2 and a second cosine signal COS2 on the basis of the first sine signal SIN1 and the first cosine signal COS1 in the same way as in the preceding two embodiments, and to send the first sine signal SIN1, the first cosine signal COS1, and the values of the second sine signal SIN2 and the second cosine signal COS2, to the electronic control unit 40.

The sensor 50 comprises a processor capable of implementing a set of instructions allowing these functions to be performed.

The electronic control unit 40 is configured to receive the first sine signal SIN1, the first cosine signal COS1, and the values of the second sine signal SIN2 and the second cosine signal COS2.

The electronic control unit 40 is configured to generate a first angle value signal SA1 representing a first angular position of the shaft 11 on the basis of the first sine signal SIN1 and the first cosine signal COS1, and a second angle value signal SA2 representing a second angular position of the shaft 11 on the basis of the values of the second sine signal SIN2 and the second cosine signal COS2.

The electronic control unit 40 is configured to calculate the mean angular position PAM of the shaft 11 at a given time t on the basis of the value of the first angle value signal SA1 at time t, the value of the second angle value signal SA2 at time t, and the predetermined phase shift value DPH, according to the following formula:

if $$(SA1(t)+SA2(t)+DPH)<360, \quad \text{[Math 57]}$$

then:

$$PAM(t)=\frac{(SA1(t)+SA2(t)+DPH)}{2} \quad \text{[Math 58]}$$

if $$(SA1(t)+SA2(t)+DPH)>360, \quad \text{[Math 59]}$$

then:

$$PAM(t)=\frac{(SA1(t)+SA2(t)+DPH)-360}{2} \quad \text{[Math 60]}$$

where SA1(*t*) is the value of the first angle value signal at time t, SA2(*t*) is the value of the second angle value signal at time t, and DPH is the predetermined phase shift value.

The electronic control unit 40 comprises a processor capable of implementing a set of instructions allowing these functions to be performed.

Fourth Embodiment

In this embodiment, the sensor 50 is configured to send the first sine signal SIN1 and the first cosine signal COS1 to the electronic control unit 40.

The sensor 50 comprises a processor capable of implementing a set of instructions allowing these functions to be performed.

The electronic control unit 40 is configured to receive the first sine signal SIN1 and the first cosine signal COS1 and to simulate (i.e. construct) a second sine signal SIN2 and a second cosine signal COS2 on the basis of the first sine signal SIN1 and the first cosine signal COS1 received in the same way as in the preceding three embodiments.

The electronic control unit 40 is configured to generate a first angle value signal SA1 representing a first angular position of the shaft 11 on the basis of the first sine signal SA1 and the first cosine signal COS1, and a second angle value signal SA2 representing a second angular position of the shaft 11 on the basis of the values of the second sine signal SIN2 and the second cosine signal COS2.

The electronic control unit 40 is configured to calculate the mean angular position PAM of the shaft 11 at a given time t on the basis of the value of the first angle value signal SA1 at time t, the value of the second angle value signal SA2 at time t, and the predetermined phase shift value DPH, according to the following formula:

if $$(SA1(t)+SA2(t)+DPH)<360, \quad \text{[Math 61]}$$

then:

$$PAM(t)=\frac{(SA1(t)+SA2(t)+DPH)}{2} \quad \text{[Math 62]}$$

if $$(SA1(t)+SA2(t)+DPH)>360, \quad \text{[Math 63]}$$

then:

$$PAM(t)=\frac{(SA1(t)+SA2(t)+DPH)-360}{2} \quad \text{[Math 64]}$$

where SA1(*t*) is the value of the first angle value signal at time t, SA2(*t*) is the value of the second angle value signal at time t, and DPH is the predetermined phase shift value.

The electronic control unit 40 comprises a processor capable of implementing a set of instructions allowing these functions to be performed.

Exemplary Embodiments

Three exemplary embodiments of the invention will now be described.

First, the shaft 11 is rotated.

Then, the first generation module 51 generates a first sine signal SIN1 and a first cosine signal COS1 characterizing the angular variations of the target 12 when the shaft 11 is rotating. This generation of sine and cosine signals on the basis of the variations in electromagnetic field direction generated by the rotating target 12 is known per se and will not be described in greater detail here.

These two steps are common to the three embodiments described below.

First Embodiment (Corresponding to the First Embodiment of the Second Configuration)

The sensor 50 constructs a second sine signal SIN2 and a second cosine signal COS2 as explained above and generates a first angle value signal SA1 representing a first angular position of the shaft 11 on the basis of the first sine signal SIN1 generated and the first cosine signal COS1 generated, and a second angle value signal SA2 representing a second angular position of the shaft 11 on the basis of the second sine signal SIN2 constructed and the second cosine signal COS2 constructed.

Then, the sensor 50 calculates the mean angular position PAM of the shaft 11 on the basis of the first angle value signal SA1, the second angle value signal SA2, and the predetermined phase shift value DPH, according to the following formula:

if $$(SA1(t)+SA2(t)+DPH)<360, \quad \text{[Math 65]}$$

then:

$$PAM(t)=\frac{(SA1(t)+SA2(t)+DPH)}{2} \quad \text{[Math 66]}$$

if $$(SA1(t)+SA2(t)+DPH)>360, \quad \text{[Math 67]}$$

then:

$$PAM(t)=\frac{(SA1(t)+SA2(t)+DPH)-360}{2} \quad \text{[Math 68]}$$

where SA1(*t*) is the value of the first angle value signal at time t, SA2(*t*) is the value of the second angle value signal at time t, and DPH is the predetermined phase shift value.

Second Embodiment (Corresponding to the Second Embodiment of the Second Configuration)

The sensor 50 constructs a second sine signal SIN2 and a second cosine signal COS2 as explained above and generates a first angle value signal SA1 representing a first angular position of the shaft 11 on the basis of the first sine signal SIN1 generated and the first cosine signal COS1 generated, and a second angle value signal SA2 representing a second angular position of the shaft 11 on the basis of the second sine signal SIN2 constructed and the second cosine signal COS2 constructed.

Then, the sensor 50 sends the first angle value signal SA1 and the second angle value signal SA2 to the electronic control unit 40.

The electronic control unit 40 receives the first angle value signal SA1 and the second angle value signal SA2 and then calculates the mean angular position PAM of the shaft 11 on the basis of the first angle value signal SA1, the second angle value signal SA2, and the predetermined phase shift value DPH, according to the following formula:

if $$(SA1(t)+SA2(t)+DPH)<360, \quad \text{[Math 69]}$$

then:

$$PAM(t)=\frac{(SA1(t)+SA2(t)+DPH)}{2} \quad \text{[Math 70]}$$

if $$(SA1(t)+SA2(t)+DPH)>360, \quad \text{[Math 71]}$$

then:

$$PAM(t)=\frac{(SA1(t)+SA2(t)+DPH)-360}{2} \quad \text{[Math 72]}$$

where SA1(*t*) is the value of the first angle value signal at time t, SA2(*t*) is the value of the second angle value signal at time t, and DPH is the predetermined phase shift value.

Third Embodiment (Corresponding to the Third Embodiment of the Second Configuration)

The sensor 50 constructs a second sine signal SIN2 and a second cosine signal COS2 as explained above and sends the first sine signal SIN1 generated, the first cosine signal COS1 generated, the second sine signal SIN2 constructed (i.e. simulated), and the second cosine signal COS2 constructed, to the electronic control unit 40.

Then, the electronic control unit 40 receives the first sine signal SIN1, the first cosine signal COS1, the second sine signal SIN2, and the second cosine signal COS2, and generates a first angle value signal SA1 representing a first angular position of the shaft 11 on the basis of the first sine signal SIN1 received and the first cosine signal COS1 received, and a second angle value signal SA2 representing a second angular position of the shaft 11 on the basis of the second sine signal SIN2 received and the second cosine signal COS2 received.

The electronic control unit 40 calculates the mean angular position of the shaft 11 on the basis of the first angle value signal SA1, the second angle value signal SA2, and the predetermined phase shift value DPH, according to the following formula:

if $$(SA1(t)+SA2(t)+DPH)<360, \quad \text{[Math 73]}$$

then:

$$PAM(t)=\frac{(SA1(t)+SA2(t)+DPH)}{2} \quad \text{[Math 74]}$$

if $$(SA1(t)+SA2(t)+DPH)>360, \quad \text{[Math 75]}$$

then:

$$PAM(t)=\frac{(SA1(t)+SA2(t)+DPH)-360}{2} \quad \text{[Math 76]}$$

where SA1(*t*) is the value of the first angle value signal at time t, SA2(*t*) is the value of the second angle value signal at time t, and DPH is the predetermined phase shift value.

Fourth Embodiment (Corresponding to the Fourth Embodiment of the Second Configuration)

The sensor 50 sends the first sine signal SIN1 and the first cosine signal COS1 to the electronic control unit 40.

The electronic control unit 40 receives the first sine signal SIN1 and the first cosine signal COS1, then simulates (i.e. constructs) a second sine signal SIN2 and a second cosine signal COS2 as explained above.

Then, the electronic control unit 40 generates a first angle value signal SA1 representing a first angular position of the shaft 11 on the basis of the first sine signal SIN1 received and the first cosine signal COS1 received, and a second angle value signal SA2 representing a second angular position of the shaft 11 on the basis of the second sine signal SIN2 simulated and the second cosine signal COS2 simulated.

The electronic control unit 40 then calculates the mean angular position PAM of the shaft 11 on the basis of the first angle value signal SA1, the second angle value signal SA2, and the predetermined phase shift value DPH, according to the following formula:

if $$(SA1(t)+SA2(t)+DPH)<360, \quad \text{[Math 77]}$$

then:

$$PAM(t)=\frac{(SA1(t)+SA2(t)+DPH)}{2} \quad \text{[Math 78]}$$

if $$(SA1(t)+SA2(t)+DPH)>360, \quad \text{[Math 79]}$$

then:

$$PAM(t)=\frac{(SA1(t)+SA2(t)+DPH)-360}{2} \quad \text{[Math 80]}$$

where SA1(*t*) is the value of the first angle value signal at time t, SA2(*t*) is the value of the second angle value signal at time t, and DPH is the predetermined phase shift value.

According to an aspect of the present invention, all or some of the functions set out above can be implemented by the sensor 50 and/or by the electronic control unit 40. In other words, the steps of the method according to an aspect of the invention can be implemented entirely by the sensor 50 or entirely by the electronic control unit 40 (with the exception of generating the first sine signal SIN1 and the first cosine signal COS1) or by both the sensor 50 and the electronic control unit 40.

Figure 8:
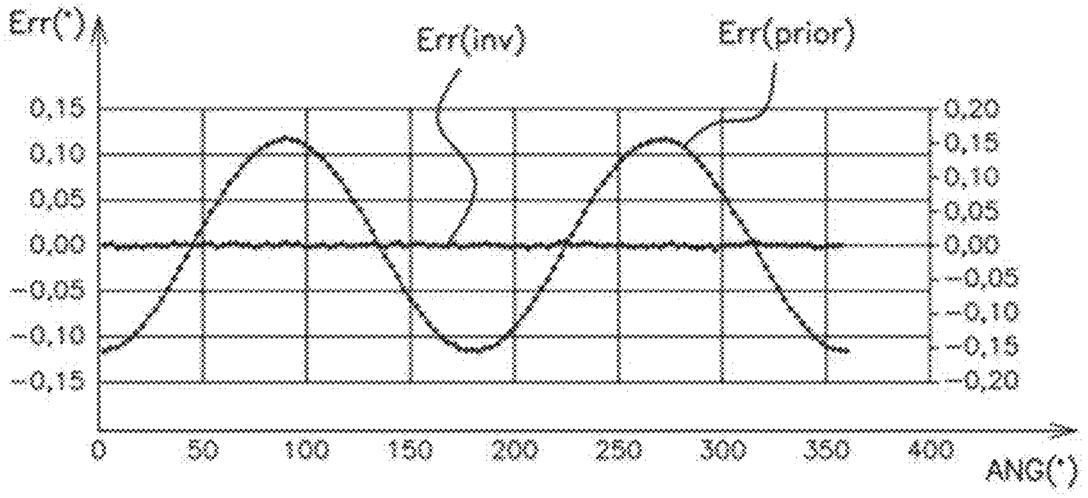
FIG. 8 illustrates an example of a signal representing the error between the angular position of a shaft calculated by a position sensor and the actual angle of the shaft following correction using the method according to an aspect of the invention in a first configuration.

FIG. 8 illustrates an example of an error Err(inv) obtained with the method according to an aspect of the invention in a system according to the first configuration. It can be seen that the error Err(inv) is between-0.01 and 0.01°, while the error without compensation by an aspect of the invention Err(prior) oscillates between −0.12° and 0.12° over a range of rotation of the shaft 11 corresponding to one revolution (360°).

Figure 9:
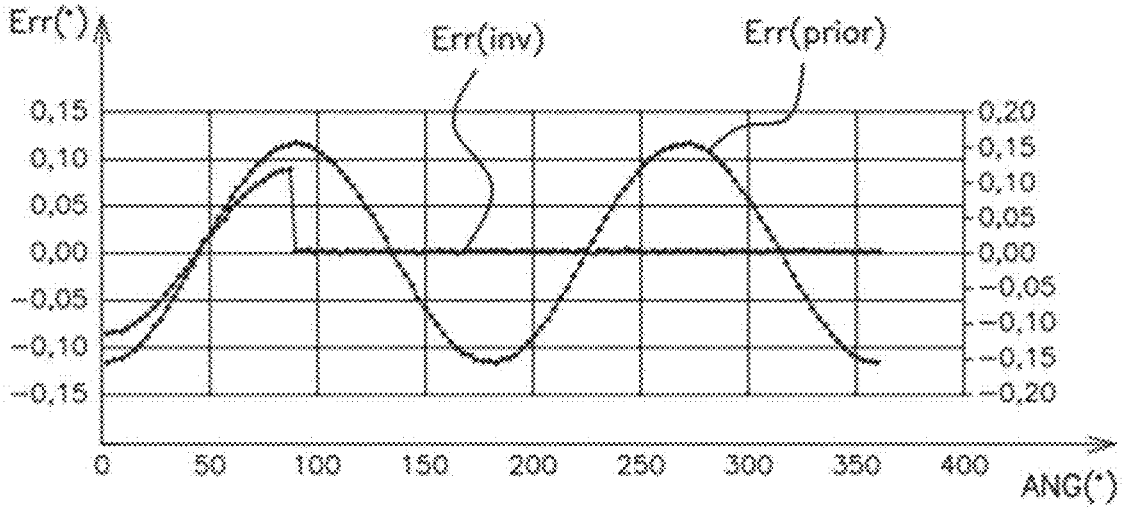
FIG. 9 illustrates an example of a signal representing the error between the angular position of a shaft calculated by a position sensor and the actual angle of the shaft following correction using the method according to an aspect of the invention in a second configuration.

FIG. 9 illustrates an example of an error Err(inv) obtained with the method according to an aspect of the invention in a system according to the second configuration. It can be seen that the error Err(inv) is between-0.08 and 0.08° during the initialization of the first 90 degrees, then between-0.01 and 0.01° once the initialization is complete, while the error without compensation by an aspect of the invention Err (prior) oscillates between −0.12° and 0.12° over a range of rotation of the shaft 11 corresponding to one revolution (360°). The initialization corresponds to the period during which the first sine signal SIN1 and the first cosine signal COS1 are generated during the first quarter revolution of the shaft, and the values of the second sine signal SIN2 and of the second cosine signal COS2 cannot be calculated as they correspond respectively to the values of the first sine signal SIN1 and the first cosine signal COS1 plus or minus 90° (phase shift DPH of quarter of a revolution).

According to an aspect of the invention, by correcting the sine signal SIN and the cosine signal COS according to the steps of the method according to an aspect of the invention, the error generated by the misalignment of the sensor 50 with the center of the target 12 is significantly reduced, or even eliminated (as it is equivalent to the ambient electronic noise).

The invention claimed is:

1. A method for measuring the angular position of a rotary shaft of a motor vehicle by means of a target fixed to a free end of said shaft and comprising a magnetic element, and a magnetoresistive position sensor mounted facing said target, said method comprising:

- generating a first sine signal and a first cosine signal characterizing the angular variations of the target relative to the sensor when the shaft is rotating,
- generating a second sine signal and a second cosine signal characterizing the angular variations of the target relative to the sensor when the shaft is rotating, the first sine signal and the second sine signal being phase-shifted by a predetermined phase shift value,
- generating a first angle value signal representing a first angular position of the shaft on the basis of the first sine signal and the first cosine signal,
- the sensor comprising at least a first generation module, the step of generating the first sine signal and the first cosine signal is performed by said first generation module on the basis of the variations in electromagnetic field direction generated by the rotation of the target and the step of generating the second sine signal and the second cosine signal is performed by said first generation module or by an electronic control unit on the basis of the first sine signal and the first cosine signal,
- generating a second angle value signal representing a second angular position of the shaft on the basis of the second sine signal and the second cosine signal,
- calculating the mean angular position of the shaft at a given time (t) on the basis of the first angle value signal, the second angle value signal, and the predetermined phase shift value, according to the following formula:

if $$(SA1(t)+SA2(t)+DPH)<360, \quad \text{[Math 81]}$$

then:

$$PAM(t)=\frac{(SA1(t)+SA2(t)+DPH)}{2} \quad \text{[Math 82]}$$

else if $$(SA1(t)+SA2(t)+DPH)>360, \quad \text{[Math 83]}$$

then:

$$PAM(t)=\frac{(SA1(t)+SA2(t)+DPH)-360}{2} \quad \text{[Math 84]}$$

where PAM(t) is the mean angular position at time t, SA1(*t*) is the value of the first angle value signal at time t, SA2(*t*) is the value of the second angle value signal at time t, and DPH is the predetermined phase shift value.

2. A non-transitory computer program product, comprising a set of program code instructions that, when executed by one or more processors, configure the one or more processors to implement a method as claimed in claim 1.

3. A magnetoresistive position sensor suitable for being mounted facing a magnetic target fixed at the end of a rotary shaft of a motor vehicle, said sensor being configured to implement the method as claimed in claim 1.

4. The sensor as claimed in claim 3, comprising at least a first generation module configured to generate the first sine signal and the first cosine signal on the basis of the variations in electromagnetic field direction generated by the rotation of the target and to generate the second sine signal and the second cosine signal on the basis of the first sine signal and the first cosine signal, or to transmit the first sine signal and the first cosine signal to an electronic control unit so that said electronic control unit generates the second sine signal and the second cosine signal on the basis of the first sine signal and the first cosine signal.

5. A motor vehicle comprising at least one rotary shaft, comprising a magnetic target fixed at one of its ends, and at least one position sensor, as claimed in claim 4, mounted facing said target.

6. A motor vehicle comprising at least one rotary shaft, comprising a magnetic target fixed at one of its ends, and at least one position sensor, as claimed in claim 3, mounted facing said target.

7. A motor vehicle comprising:

- an electronic control unit,
- at least one rotary shaft comprising a target fixed at one of its ends,
- a position sensor mounted facing said target and connected by at least one communication link to the electronic control unit, the sensor being configured to generate a first sine signal and a first cosine signal characterizing the angular variations of the target when the shaft is rotating, and to send the first sine signal and the first cosine signal to the electronic control unit,
- the electronic control unit being configured to:
  - receive the first sine signal and the first cosine signal,
  - simulate a second sine signal and a second cosine signal characterizing the angular variations of the target when the shaft is rotating on the basis of the first sine signal and the first cosine signal, the first sine signal and the second sine signal being phase-shifted by a predetermined phase shift value, the first cosine signal and the second cosine signal being phase-shifted by a predetermined phase shift value,
  - generate a first angle value signal representing a first angular position of the shaft on the basis of the first sine signal received and the first cosine signal received,
  - generate a second angle value signal representing a second angular position of the shaft on the basis of the second sine signal simulated and the second cosine signal simulated,
  - calculate the mean angular position of the shaft at a given time on the basis of the value of the first angle value signal, the value of the second angle value signal, and the predetermined phase shift value, according to the following formula:

if $$(SA1(t)+SA2(t)+DPH)<360, \quad \text{[Math 89]}$$

then:

$$PAM(t)=\frac{(SA1(t)+SA2(t)+DPH)}{2} \quad \text{[Math 90]}$$

if $$(SA1(t)+SA2(t)+DPH)>360, \quad \text{[Math 91]}$$

then:

$$PAM(t)=\frac{(SA1(t)+SA2(t)+DPH)-360}{2} \quad \text{[Math 92]}$$

where PAM(t) is the mean angular position at time t, SA1(*t*) is the value of the first angle value signal at time t, SA2(*t*) is the value of the second angle value signal at time t, and DPH is the predetermined phase shift value.

* * * * *